US 6,732,516 B2

(12) United States Patent
Butera et al.

(10) Patent No.: US 6,732,516 B2
(45) Date of Patent: May 11, 2004

(54) ACTUATOR DEVICE WITH A FLEXIBLE CABLE INCORPORATING A SHAPE-MEMORY ELEMENT

(75) Inventors: Francesco Butera, Turin (IT); Marco Biasiotto, Turin (IT); Stefano Alacqua, Rivoli (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 0 days.

(21) Appl. No.: 10/344,987
(22) PCT Filed: Jun. 25, 2002
(86) PCT No.: PCT/IB02/02361
§ 371 (c)(1), (2), (4) Date: Feb. 20, 2003
(87) PCT Pub. No.: WO03/003137
PCT Pub. Date: Jan. 9, 2003

(65) Prior Publication Data
US 2003/0173863 A1 Sep. 18, 2003

(30) Foreign Application Priority Data
Jun. 27, 2001 (IT) ....................... TO2001A0618

(51) Int. Cl.⁷ ............................................... F01B 29/10
(52) U.S. Cl. ........................................ 60/527; 60/528
(58) Field of Search ..................... 60/527, 528, 529

(56) References Cited

U.S. PATENT DOCUMENTS

| 4,751,821 A | * | 6/1988 | Birchard ...................... 60/698 |
| 5,272,486 A | | 12/1993 | Dickinson |
| 5,275,885 A | | 1/1994 | Ogura |
| 5,624,381 A | * | 4/1997 | Kieturakis .................. 600/206 |
| 5,822,989 A | * | 10/1998 | Sturdevant et al. ........... 60/528 |
| 6,106,518 A | * | 8/2000 | Wittenberger et al. ......... 606/23 |
| 6,454,775 B1 | * | 9/2002 | Demarais et al. ........... 606/128 |

FOREIGN PATENT DOCUMENTS

| DE | 199 16 244 C | 9/2000 |
| GB | 2 021 265 A | 11/1979 |

* cited by examiner

Primary Examiner—Hoang Nguyen
(74) Attorney, Agent, or Firm—Sughrue Mion, PLLC

(57) ABSTRACT

An actuator device comprises a flexible cable (2) and opposite ends (4, 5), one of which is connected to a control member and the other to a controlled member. At least one portion of the flexible cable (2) is made of a shape-memory material in such a way that the device can be used both as a mechanical element of flexible transmission between the control member and the controlled member, and as a shape-memory actuator, designed to operate the controlled member following upon a variation in length of said shape-memory portion.

5 Claims, 5 Drawing Sheets

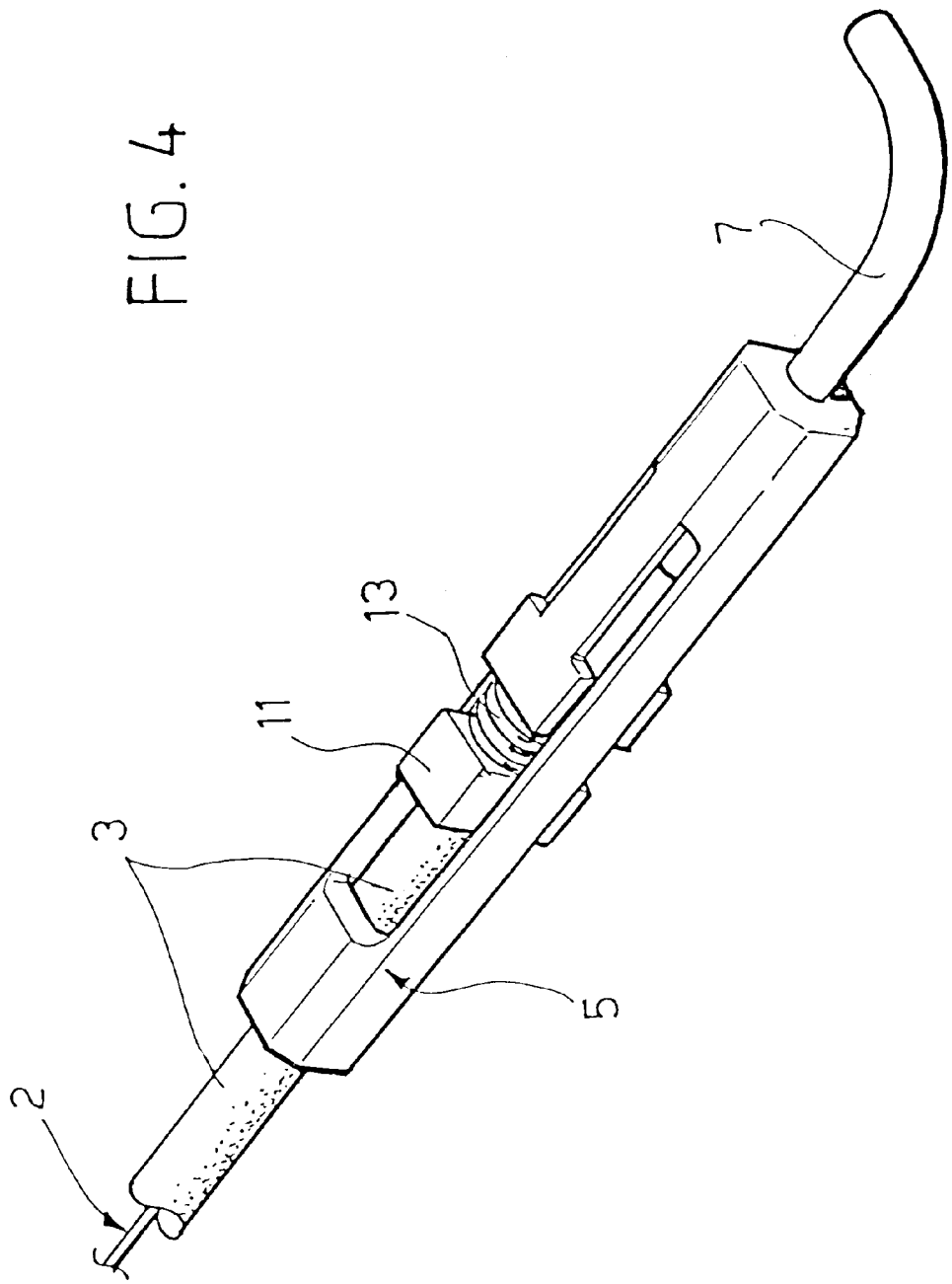

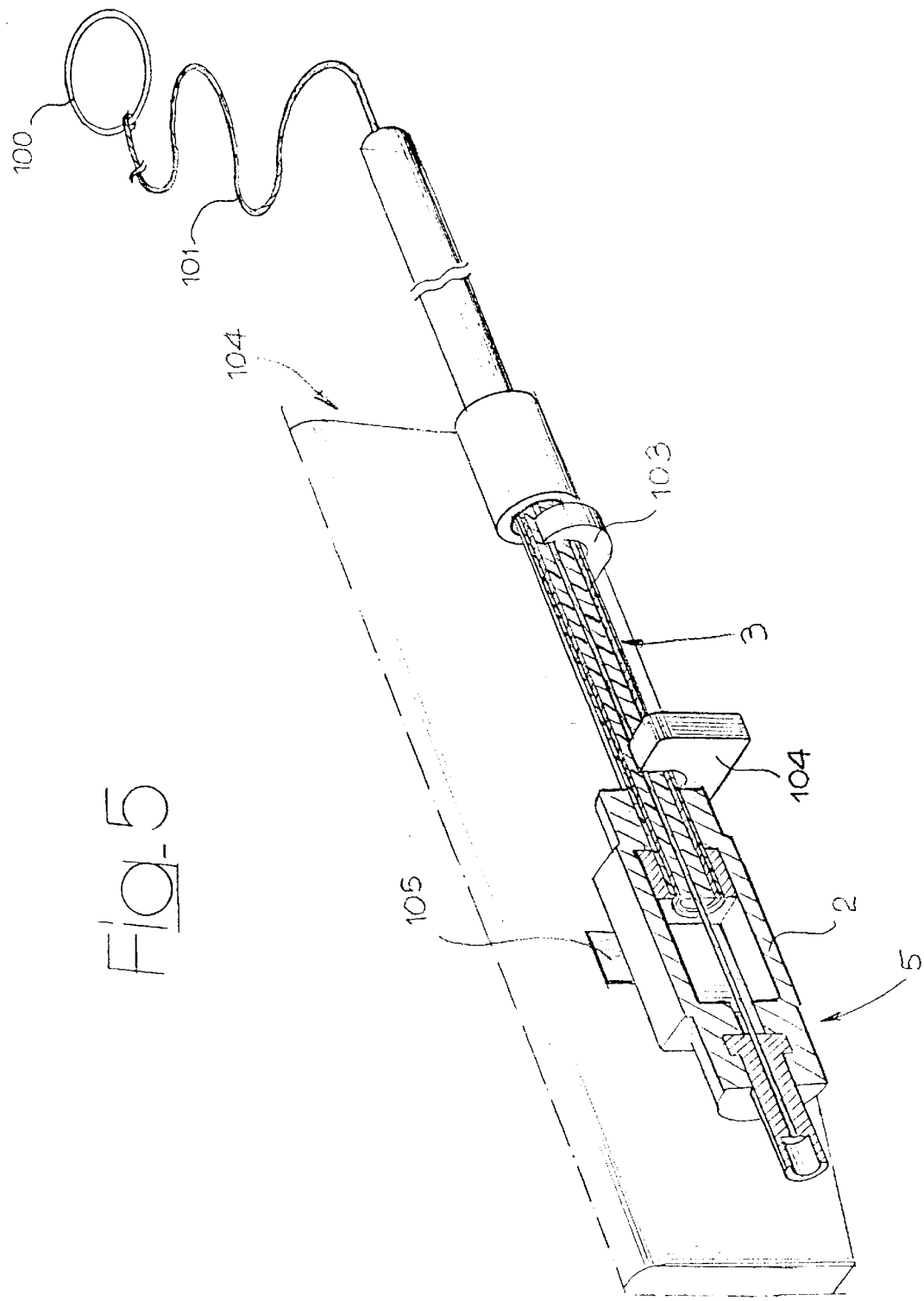

ACTUATOR DEVICE WITH A FLEXIBLE CABLE INCORPORATING A SHAPE-MEMORY ELEMENT

This is a National Stage Entry of Application No. PCT/IB02/02361 filed Jun. 27, 2001; the disclosure of which is incorporated herein by reference.

BACKGROUND OF THE INVENTION

The present invention relates to an actuator device comprising a flexible cable, having one end connected to a control member and a flexible sheath, in which the flexible cable is mounted, where at least one portion of the flexible cable is made of a shape-memory material, which is able to undergo a variation in shape following upon its being heated, in order to control the controlled member.

Flexible-cable actuator devices find application in a wide range of fields and in general wherever it is necessary to provide for simple and inexpensive mechanical transmission which will enable remote control of displacement of a member. Flexible-cable actuator devices are, for instance, used to enable manually controlled actuation in motor vehicles, for example for release, from inside the vehicle, of the hatchback door or the bonnet, or for operation of mobile parts or mechanisms for car-seat adjustment, or for operation of mobile members of the engine or facilities on board the vehicle.

A flexible-cable actuator device having the characteristics referred to at the beginning of the present description, is known from the document DE-C-199 16 244. This known device is designed always to be controlled manually. However, its operation causes an activation of the shape-memory element, with the consequence that the controlled member undergoes an additional displacement with respect to the displacement caused by mere manual operation.

SUMMARY OF THE INVENTION

Instead, the purpose of the present invention is to provide an actuator device of the type referred to at the beginning of the present description, which will be selectively usable as a manually controlled mechanical transmission, as well as just by electrical operation.

With a view to achieving the above purpose, the subject of the invention is an actuator device comprising:
- a flexible cable, having one end connected to a controlled member; and
- a flexible sheath within which the flexible cable is mounted;
- in which at least one portion of the flexible cable is made of a shape-memory material, that is able to undergo a variation in shape following upon its being heated, so as to control the controlled member;
- characterized in that the aforesaid sheath is mounted with respect to a fixed supporting structure, so as to be free to displace longitudinally only in a direction corresponding to the direction of operation of the controlled member; and
- in that the aforesaid sheath is coupled to the controlled member, so as to be able to transmit to the latter a displacement in the aforesaid direction of operation and so as to be decoupled, instead, from the controlled member when there is a displacement in the opposite direction, in such a way that said actuator can be used both manually, as a mechanical-transmission element, using the sheath as transmission element, and by exploiting the variation in shape of the shape-memory cable induced by the fact of its being heated.

It is, in the first place, to be pointed out that the invention is of general application and can therefore also be used outside the automobile sector, and, in particular, in any sector in which it might prove useful to apply an actuator device that can be operated both manually and electrically.

Shape-memory actuator elements have been known for some time and used in a wide range of fields in which it is necessary to have available actuator means of simple structure and low cost. They use shape-memory metal alloys that can undergo deformation after a predetermined transition temperature is exceeded. In general, heating may be obtained in so far as the actuator element is able to detect directly a variable ambient temperature, or else by supplying an electrical current through the actuator element so as to heat it by the Joule effect. In this case, the electric-supply means may also be associated to electronic control means designed for controlling current supply on the basis of a signal detected by a temperature sensor, a position sensor or displacement sensor, or a potentiometer.

In the preferred embodiment of the present invention, electric-supply means are provided so that the flexible cable will be traversed by an electric current for it to be heated by the Joule effect above the transition temperature.

When the device is used as a simple mechanical-transmission element, it is sufficient to exert a tensile force on one end of the sheath for the said tensile force to be transmitted by the latter to the controlled member. In the alternative mode of operation, no tensile force is exerted on the device, and it is just necessary to enable supply of electric current through the flexible cable, so as to cause contraction by the shape-memory effect.

In a wide range of applications, associated to the controlled member are elastic means, which recall it towards a resting position. In many cases, such elastic means associated to the controlled member may be sufficient to ensure that the actuator device according to the present invention will return to its starting condition when the shape-memory flexible cable is cooled off to bring it back into its condition of greater length. In other applications, it may instead be advantageous to incorporate, in the aforesaid bushing, elastic means, designed for favouring return of the shape-memory element to its resting condition.

BRIEF DESCRIPTION OF THE DRAWINGS

It is evident that the invention provides an actuator device which is extremely simple and inexpensive and which enables operation of a controlled member both in a traditional way, by exerting a tensile force on the flexible transmission, and electrically, by causing a contraction of the shape-memory cable.

Further characteristics and advantages of the present invention will emerge from the ensuing description, with reference to the attached drawings, which are provided purely by way of non-limiting example and in which:

FIGS. 3 and 4 are perspective views of a detail of the actuator device of FIGS. 1 and 2 in two different operating conditions; and FIG. 5 illustrates a further embodiment used for controlling the lock of a rear hatchback door of a motor vehicle.

DETAILED DESCRIPTION OF THE INVENTION

With reference to the drawings, number 1 designates, as a whole, an actuator device comprising a flexible cable 2 that extends inside a flexible sheath 3. As already mentioned previously, the flexible cable 2 is made entirely, or at least in one of its portions, of a shape-memory metal alloy that has a transition temperature above which the flexible cable 2 undergoes a retraction. The sheath 3 can be made of any known material typically adopted for this purpose.

Figure 1:
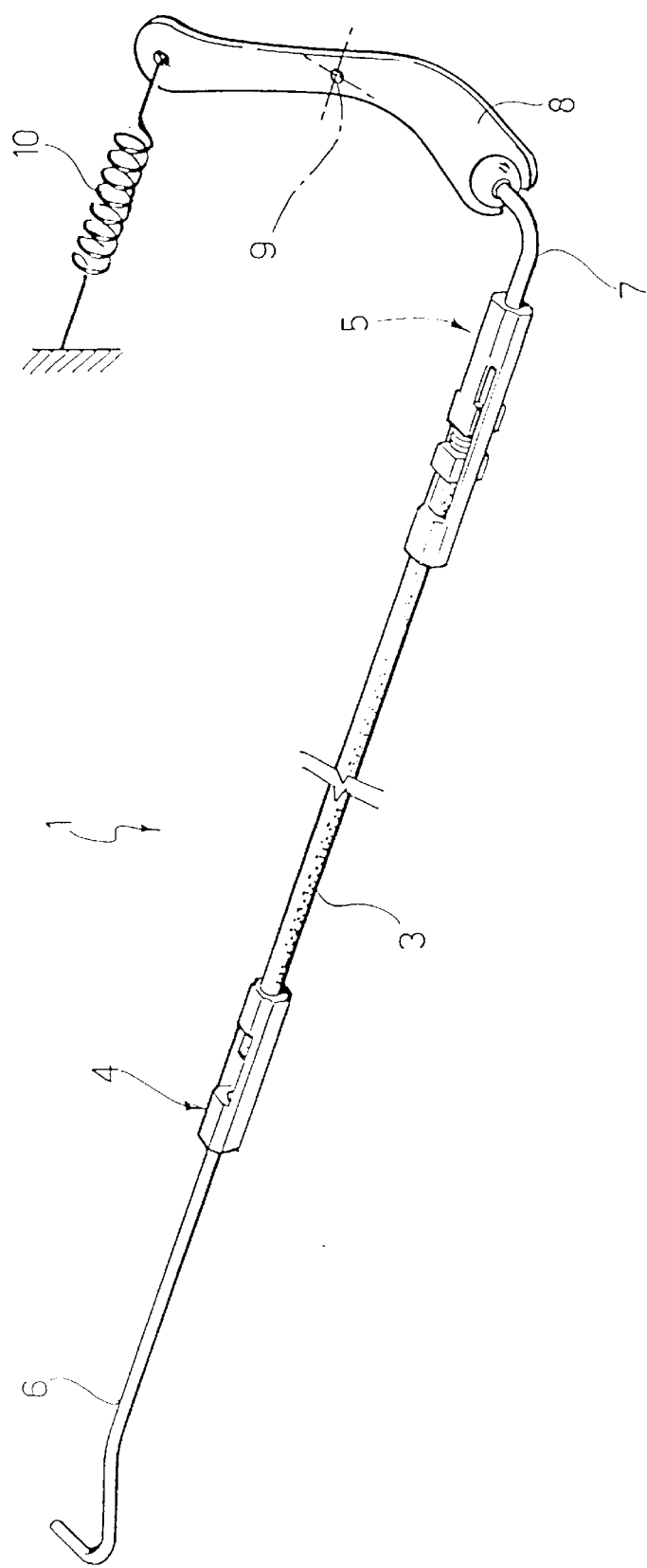
FIG. 1 is a perspective view of a preferred embodiment of an actuator device according to the invention.
Figure 2:
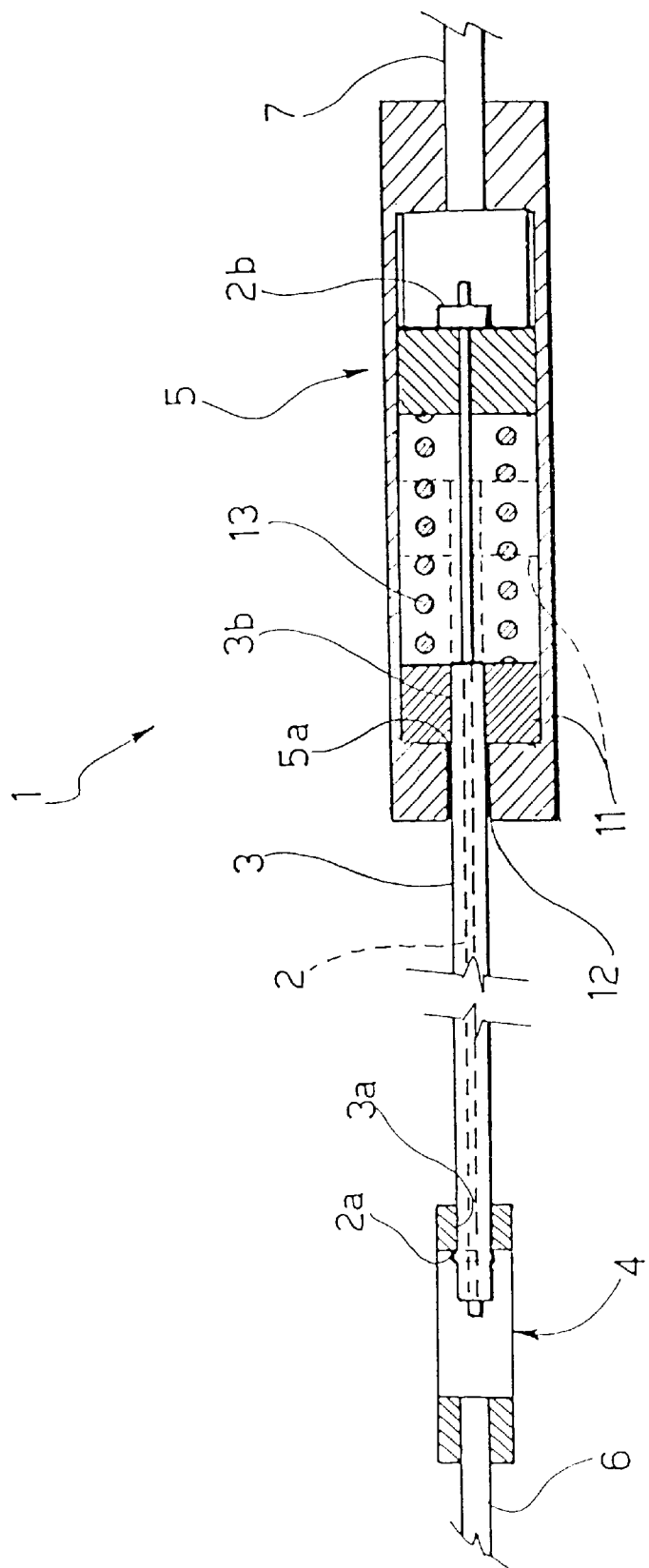
FIG. 2 is a partial cross-sectional view of the actuator device of FIG. 1.

With reference in particular to FIG. 2, the device 1 comprises two end bodies 4, 5, respectively provided with hooks 6, 7, respectively for connection to a control member of any type (for example, a manually operated control lever, or else a control grip, or a motor-powered actuator) either directly or with interposition of a further mechanical transmission. Likewise, the second end body 5 is designed to be connected by means of the hook 7 to any controlled member, whether directly or with interposition of a further mechanical transmission. Purely by way of example, FIG. 1 illustrates a controlled member made up of a lever 8 mounted in rocker fashion about an axis 9 and subject to the return action of a spring 10.

Figure 3:
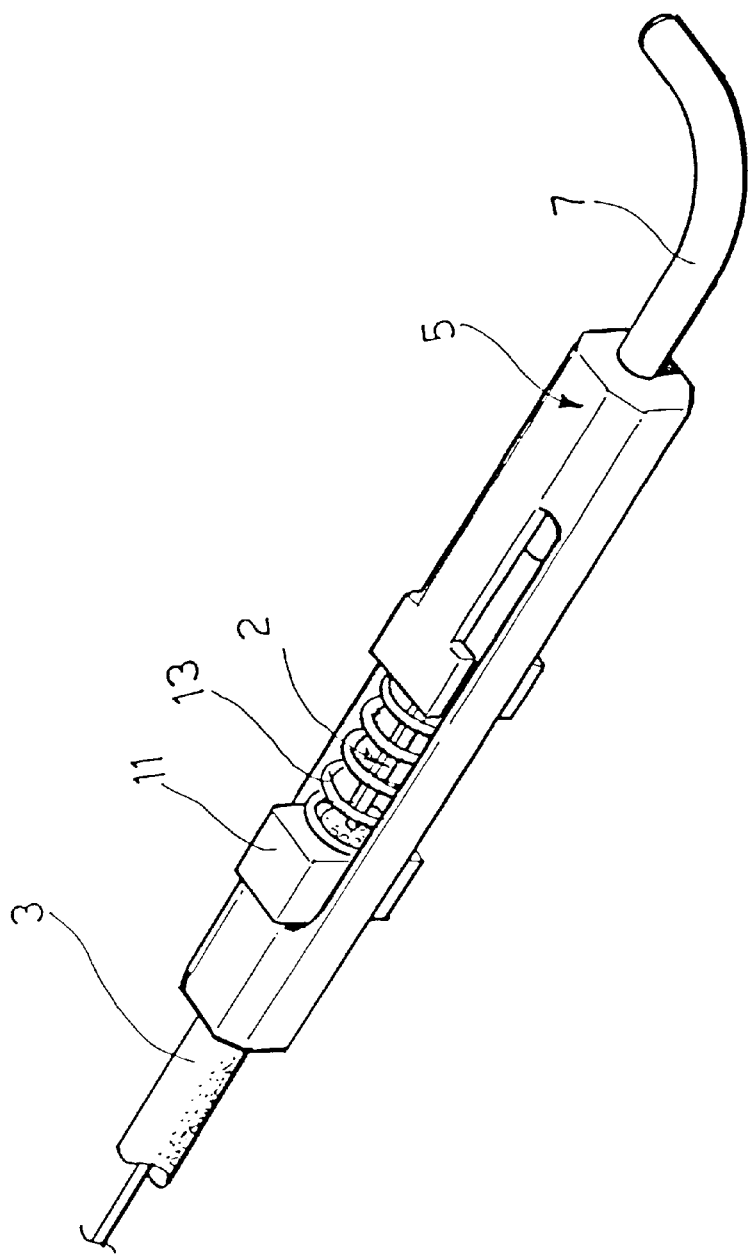

With reference to FIG. 2, the flexible cable 2 has a first end 2a stably secured to the first end body 4, and a second end 2b stably secured to the second end body 5, which is made in the form of a bushing. The sheath 3 has a first end 3a, which is stably anchored both to the end 2a of the flexible cable 2 and to the first end body 4, and a second end 3b, which is mounted so that it can slide within an end hole 12 of the bushing 5 and which is provided with an arrest ring 11 rigidly connected to the sheath 3 and designed to cooperate with an internal contrast surface 5a of the bushing 5. In the example illustrated, a helical spring 13 set inside the bushing 5, between the end 2b of the flexible cable and the arrest ring 11 associated to the sheath 3, tends to maintain the bushing 5 and the end 3b of the sheath in the relative position illustrated in FIG. 2. This position also corresponds to the condition illustrated in FIG. 3.

As already mentioned previously, when the aim is to use the device 1 as a simple flexible mechanical transmission, it is sufficient to apply a tensile force on the hook 6 for this force to be transmitted, through the first end body 4, the sheath 3 (which functions as a transmission element), the arrest ring 11, the contrast surface 5a, and the bushing 5, to the hook 7 connected to the controlled member 8. When the action of the tensile force is interrupted, the spring 10 tends to bring the controlled member 8 back into the resting position.

Alternatively, it is possible to bring about action of the controlled member 8 without applying any tensile force on the device 1. In this case, electric current is simply supplied through the flexible cable 2, so as to cause it to heat, by the Joule effect, above its transition temperature, with the consequence that the flexible cable 2 retracts, and its two ends 2a, 2b approach one another. Consequently, the bushing 5 anchored to the end 2b of the flexible cable slides over the sheath 3, and the arrest ring 11 moves axially away from the contrast surface 5a of the bushing, compressing the spring 13 (see FIG. 4). Consequently, the end hook 7 approaches the hook 6, causing movement of the controlled member 8. As the electric current ceases to circulate through the flexible cable 2, the spring 10 brings the controlled member 8 back into the resting condition, whilst the spring 13 ensures return of the bushing 5 to the starting condition.

The electric power-supply means may be connected to two terminals set one at either end of the flexible cable 2. The two supply terminals can be set close to one another and set adjacent to one of the ends of the flexible cable, the other end being electrically connected to one of the terminals through an electrical path made on the inner surface of the sheath 3.

FIG. 5 illustrates an example of application of the actuator according to the invention to the control of the lock of a rear hatchback door of a motor vehicle. There exist standards that oblige manufacturers to provide for the possibility of manual actuation of the lock from inside the vehicle, so as to enable opening of the hatchback for a person who might accidentally have remained shut inside the vehicle. In the example illustrated, where parts that correspond to those of the previous figures are designated using the same reference numbers, the actuator can be operated manually by means of a ring 100, which is connected, via a cable 101, to the sheath 3 of the actuator device according to the invention. Secured on the sheath 3 is a bushing 102, designed to bear upon a fixed arrest 103 forming part of the structure 104 of the device of the hatchback-door lock. The co-operating action of the bushing 102 fixed to the sheath 3 and of the arrest 103 is equivalent to the one obtained in the case of FIG. 2 by contact of the element 2a fixed to the sheath 3 against the corresponding arrest contrast surface made in the end body 4. Thanks to the arrangement of said parts, any displacement of the sheath in a direction opposite to the direction of operation of the actuator is prevented. Otherwise, the structure of the device is the same, with the shape-memory cable 2 secured, at one end, to the cylinder 5, which is, in turn, connected, through a slit 105 made in the body of the lock, to the controlled member of the lock. When the actuator is operated manually by acting on the ring 100, the mechanical tensile force is transmitted through the sheath 3, which displaces towards the right (as viewed in FIG. 5), so causing a shifting-away of the bushing 102 from the fixed arrest 103. The displacement of the sheath 3 causes a corresponding displacement of the cylinder 5 by resting of the element 11 against the contrast surface 5a of the cylinder. In the case, instead, of electrical operation, the sheath 3 remains stationary, since it cannot be displaced towards the left following upon engagement of the bushing 102 against the fixed arrest 103, whilst the shape-memory cable is shortened, so causing sliding of the cylinder 5 over the sheath 3 and again operation of the controlled member.

The advantage of using the sheath of the actuator device according to the invention as element of mechanical transmission in the case of manual operation lies also in the fact that, in this way, it is possible always to guarantee operation of the device also in the case of an accidental failure of the shape-memory flexible cable.

In systems of actuation of locks of motor-vehicle doors with automatic recognition of the owner via a badge, detection of fingerprints or the like, it is possible to provide for a pre-heating of the shape-memory wire up to a temperature just below the start-of-transition temperature during the step of recognition of the owner, in such a way as to reduce to the minimum the time required for the actuation step once the signal for confirmation of opening of the motor-vehicle lock has arrived.

Preferably, a feedback signal is envisaged according to the temperature detected by a sensor on board the vehicle and/or a sensor forming part of the electronic control unit of the motor vehicle and/or by a sensor integrated in the sheath, so as to control the power for having the actuation time constant with variation in ambient temperature and/or for controlling the pre-heating step and/or for preserving the shape-memory wire.

It is possible to have a feedback on the electrical resistance of the shape-memory wire, so as to drive it in an optimal way and/or pre-heat it and/or save power during actuation and/or preserve the wire through sending and subsequent detection of a low-power electric signal at a certain known frequency and/or a modulated signal superimposed upon the actual signal driving the wire.

The sheath and/or protective layer provided thereon can be made of active material (for example a piezoelectric or pyroelectic polymer), so as to control the temperature, actuation, and the load on the shape-memory element.

Heating of the wire may also be obtained by induction. The sheath and/or protective layer provided thereon may also be external heaters for driving the shape-memory wire set inside. The possible spring provided for facilitating return of the shape-memory wire into the resting position may also be used as an electrical contact for supply of electric current to the wire. Preferably, moreover, there may be provided a control on electrical driving, in order to reduce the effect of thermal inertia during actuation via control of the electric power supplied with experimentally pre-set logics or with feedback on the state of the shape-memory element.

Finally, there may be provided a self-diagnosis of the shape-memory wire by measurement of the electrical continuity and/or the resistance. There may be provided, for example, a warning light that lights up in the event of failure of the shape-memory wire.

Of course, without prejudice to the principle of the invention, the details of construction and the embodiments may vary widely with respect to what is described and illustrated herein purely by way of example, without thereby departing from the scope of the present invention.

What is claimed is:

1. An actuator device comprising:

a flexible cable (2), having one end (2b) connected to a controlled member; and a flexible sheath (3), within which the flexible cable (2) is mounted;

in which at least one portion of the flexible cable (2) is made of a shape-memory material which is able to undergo a variation in shape following upon heating, so as to control the controlled member;

characterized in that said sheath (3) is mounted with respect to a fixed supporting structure (103) so as to be free to displace longitudinally only in the direction of operation of the controlled member; and in that said sheath (3) is coupled to the controlled member so as to be able to transmit thereto a displacement in said direction of operation and to be, instead, decoupled from the controlled member with respect to a movement in the direction opposite to the direction of operation;

in such a way that the said actuator can be used both by means of manual operation, using the sheath as a mechanical transmission element and exploiting the variation in shape of the shape-memory cable, which can be obtained by heating it.

2. The actuator device according to claim 1, characterized in that activation of the shape-memory cable is obtained by causing it to be heated by the Joule effect by means of supply of electric current.

3. The actuator device according to claim 2, characterized in that:

said electric power-supply means are controlled according to a closed-loop logic on the basis of a signal emitted by temperature-sensing, position-sensing, or current-sensing means, or according to the variation in resistance of the cable (2).

4. The actuator device according to claim 1, characterized in that it further comprises elastic means, which recall the shape-memory flexible cable (2) towards its resting condition.

5. The actuator device according to claim 1, characterized in that it comprises a fixed outer auxiliary sheath functioning as guide for movement of said sheath.

* * * * *